(No Model.)

D. D. MacKAY & B. A. ARMSTRONG.
SILK TESTER.

No. 280,491. Patented July 3, 1883.

WITNESSES:
M. C. Brown.
F. Mason

INVENTOR
D. D. MacKay,
B. A. Armstrong,
BY E. R. Brown
ATTORNEY

UNITED STATES PATENT OFFICE.

DONALD D. MacKAY, OF WHITESTONE, NEW YORK, AND BENJAMIN A. ARMSTRONG, OF NEW LONDON, CONNECTICUT.

SILK-TESTER.

SPECIFICATION forming part of Letters Patent No. 280,491, dated July 3, 1883.

Application filed May 7, 1883. (No model.)

*To all whom it may concern:*

Be it known that we, DONALD D. MACKAY, of Whitestone, in the county of Queens and State of New York, and BENJAMIN A. ARMSTRONG, of New London, in the county of New London and State of Connecticut, have invented certain new and useful Improvements in Silk-Testers; and we do hereby declare that the following is a full, clear, and exact description of the same.

This invention relates to certain improvements in instruments for testing the strength of silk and other threads, an example of which is found in the invention of Ira Dimock and George Dimock, patented March 7, 1876, No. 174,496. Said invention consists of "a spring-balance provided with a bar graduated to a scale of weights and lengths for the purpose of testing the quantity and quality of silk and other threads." In said invention the graduated bar has marked upon it pounds and fractions thereof, and in the operation of testing the thread the point of breakage is indicated by means of a spring-pawl, the point of which engages with ratchet-teeth formed on said graduated bar. The engagement of this spring-pawl with the ratchet prevents the graduated bar from receding until said pawl is disengaged from said ratchet.

Our invention consists in a novel construction, arrangement, and combination of a casing, a tube, a spring, a pointer or indicator, and devices connected therewith, whereby provision is made for allowing the spring and its carrier to recede after the breaking of the thread, and for causing the pointer or indicator to remain in position at the point of breakage independent of said spring and carrier, as hereinafter more particularly described and set forth.

Figure 1:
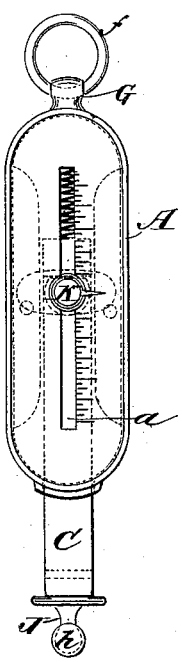
Figure 2:
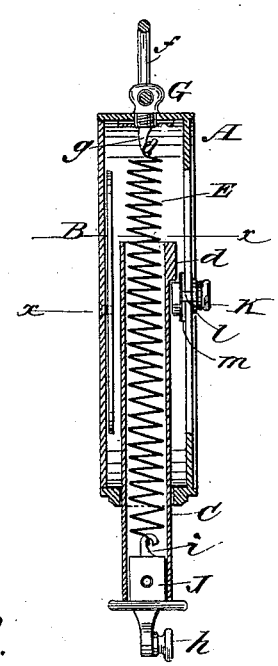
Figure 3:
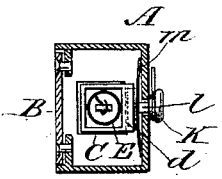

In the accompanying drawings, Figure 1 is a face or front view of an instrument embodying our improvements. Fig. 2 is a longitudinal vertical sectional view of the same. Fig. 3 is a transverse sectional view taken in the line $x$ $x$ of Fig. 2.

The casing A may be of any suitable shape in its cross-section, either angular or rounded. It is here shown as angular, with a slot, $a$, in its face, and provided with a removable back plate, B, held in place by screws passing through the plate and into lugs or flanges inside of the casing.

Inside of the casing A works a tube, C, which is preferably angular, in order to prevent it from turning. When the instrument is not in use, the upper end of the tube C rests against the inner surface of the upper end of the casing, and the lower end of the tube passes through an opening in the lower end of the casing, and is about flush with the outer surface of the lower end of the casing.

Near the upper end of the tube, on the side nearest the face of the casing, is a lug or projection, $d$. If the tube should be round instead of square, a flange or collar may be provided instead of the lug $d$. The tube C incloses a spiral spring, E.

In the upper end of the casing is inserted a plug, G, which may be screwed in or otherwise secured in place. The upper end of the plug is provided with a ring, $f$, by which it may be suspended or held in the hand, and its lower end is provided with a hook, $g$, which engages with the upper end of the spring E.

In the lower end of the tube C is inserted a plug, J, which is here shown as secured by a rivet. The lower end of this plug is provided with a knob or stud, $h$, for the attachment of the thread to be tested, and its upper end is provided with a hook, $i$, which engages with the lower end of the spring E. The tube C, carrying the spring E, is inserted through the opening in the lower end of the casing, and after the upper end of the spring has been adjusted to the hook $g$ the back plate, B, is secured in place.

The pointer or indicator K is provided with a shank, $l$, which works snugly in the slot $a$ of the casing A. This shank $l$ passes through a flat spring or plate, $m$, which presses against the inner surface of the face of the casing on each side of the slot $a$, and the inner end of the shank is secured by upsetting the metal sufficiently to hold the spring in place, and yet to project inwardly beyond the surface of the spring; or, in lieu of this method, the shank may consist of a rivet passed from the inside of the casing through the spring or plate $m$, through the slot $a$, and through a hole in the head of the pointer, and then upset and finished on the outer surface of the pointer, in which case the head of the rivet will form the projecting part of the shank.

In using this instrument the thread is attached to the knob or stud and the test is made in the usual way. As the tube C is pulled down and the spring E expanded, the lug or projection *d* engages with the projecting inner end or head of the shank *l* and pulls the indicator K down with it. The friction of the spring or plate *m* is not sufficient to offer any perceptible resistance to the operation of the lug, but only sufficient to hold the indicator in place at any point in which it may be carried. When the thread breaks, the spring E immediately contracts and carries the tube C back to its original position; but the friction of the plate *m* holds the pointer or indicator at the point of breakage, and thus permanently indicates the same, after which the indicator may be pushed up to the starting-point again.

What we claim as new, and desire to secure by Letters Patent, is—

In a silk-tester, the combination of the tube or carrier C, provided with the shoulder or projection *d*, and the pointer or indicator K, provided with the friction plate or spring *m*, attached to the shank *l*, whereby provision is made for holding the indicator in place at the point of breakage, substantially as herein described.

D. D. MACKAY.
    B. A. ARMSTRONG.

Witnesses:
 E. R. BROWN,
 A. H. NONES.